United States Patent
Nogami et al.

(10) Patent No.: US 9,400,024 B2
(45) Date of Patent: Jul. 26, 2016

(54) RAILWAY VEHICLE BRAKE DISC

(71) Applicant: NIPPON STEEL & SUMITOMO METAL CORPORATION, Tokyo (JP)

(72) Inventors: Hiroshi Nogami, Tokyo (JP); Go Adachi, Tokyo (JP); Kazutaka Asabe, Tokyo (JP); Atsushi Sakaguchi, Tokyo (JP); Kenji Tamura, Tokyo (JP); Takanori Kato, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/422,853

(22) PCT Filed: Sep. 5, 2013

(86) PCT No.: PCT/JP2013/073914
§ 371 (c)(1),
(2) Date: Feb. 20, 2015

(87) PCT Pub. No.: WO2014/038621
PCT Pub. Date: Mar. 13, 2014

(65) Prior Publication Data
US 2015/0247541 A1     Sep. 3, 2015

(30) Foreign Application Priority Data
Sep. 7, 2012  (JP) ................. 2012-196820

(51) Int. Cl.
| | |
|---|---|
| *F16D 65/12* | (2006.01) |
| *B61H 5/00* | (2006.01) |
| *F16D 65/00* | (2006.01) |
| *F16D 65/847* | (2006.01) |
| *F16D 65/02* | (2006.01) |

(52) U.S. Cl.
CPC ............. *F16D 65/124* (2013.01); *B61H 5/00* (2013.01); *F16D 65/0006* (2013.01); *F16D 65/12* (2013.01); *F16D 65/128* (2013.01); *F16D 65/847* (2013.01); *F16D 2065/1328* (2013.01)

(58) Field of Classification Search
CPC ..... F16D 65/12; F16D 65/124; F16D 65/128; F16D 65/847; F16D 65/0006; B61H 5/00
USPC .................................................... 188/218 XL
See application file for complete search history.

(56) References Cited

U.S. PATENT DOCUMENTS

2015/0232108 A1*  8/2015 Mosbach ............. F16D 65/124
                                                              188/218 XL

FOREIGN PATENT DOCUMENTS

| EP | 0 644 349 | 3/1995 |
|---|---|---|
| GB | 1171718 | * 11/1969 |
| JP | 05-321959 | 12/1993 |
| JP | 2005-214263 | 8/2005 |
| JP | 2006-009862 | 1/2006 |
| JP | 2007-205428 | 8/2007 |
| JP | 2008-291877 | 12/2008 |
| WO | 2010/071169 | 6/2010 |
| WO | 2011/051603 | 5/2011 |

* cited by examiner

*Primary Examiner* — Vishal Sahni
(74) *Attorney, Agent, or Firm* — Clark & Brody (57) ABSTRACT

A railway vehicle brake disc which can reduce aerodynamic sound raised high speed running, improve cooling performance during braking, and improve durability comprises a donut-shaped disc section having a sliding surface on a front surface side, a plurality of fin sections, each convexly provided in a rear surface of the disc section in a radial pattern, and a bolt hole passing through the disc section and the fin section. The disc section is mounted on a wheel in a state where the fin sections contact a plate section of the wheel using a bolt inserted into the bolt hole. The fin section has a groove formed along a circumferential direction in at least one of an area on an inner peripheral side and an area on an outer peripheral side of the bolt hole when viewed in a radial direction of the disc section.

4 Claims, 8 Drawing Sheets

RAILWAY VEHICLE BRAKE DISC

TECHNICAL FIELD

The present invention relates to a brake disc which is a key component of a braking device in a railway vehicle, and particularly to a railway vehicle brake disc in which a disc section serving as a sliding surface is fastened to a wheel with a bolt.

BACKGROUND ART

As the braking device of the railway vehicle, a disc brake excellent in braking performance is frequently used with increase in speed and size of a vehicle. In the disc brake, a brake disc is mounted on a wheel by being fastened with a bolt, a braking force due to frictional resistance is generated by a brake lining pushed against a sliding surface of the brake disc, and thus the rotation of the wheel is braked to regulate a speed of the vehicle.

Figure 1A:
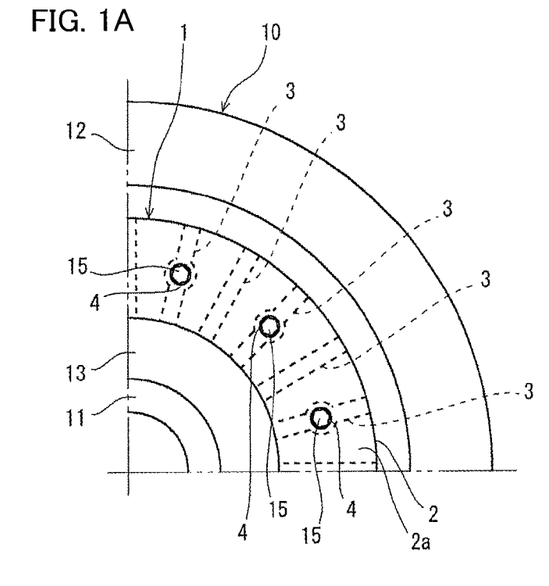
FIG. 1A illustrates a plan view of a ¼ circular portion in a front surface view.
Figure 1B:
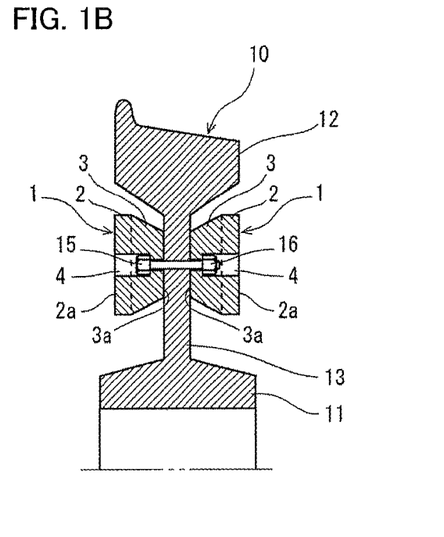
FIG. 1B illustrates a cross-sectional view taken along the radial direction of a ½ circular portion.
Figure 2A:
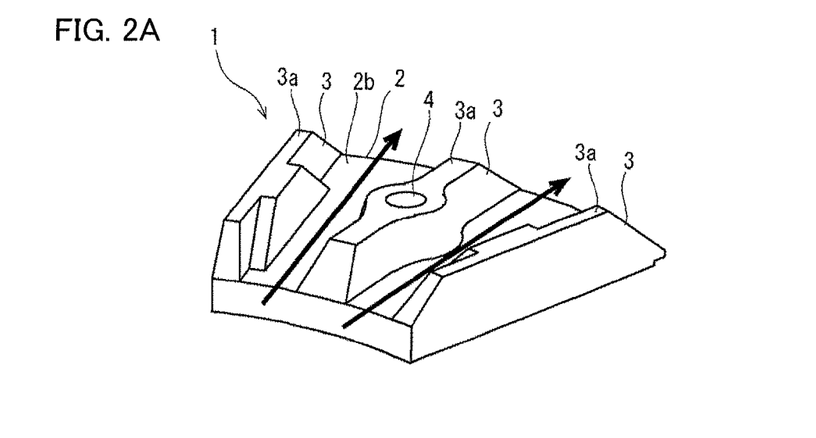
FIG. 2A illustrates a partial perspective view when viewed from a rear surface side.
Figure 2B:
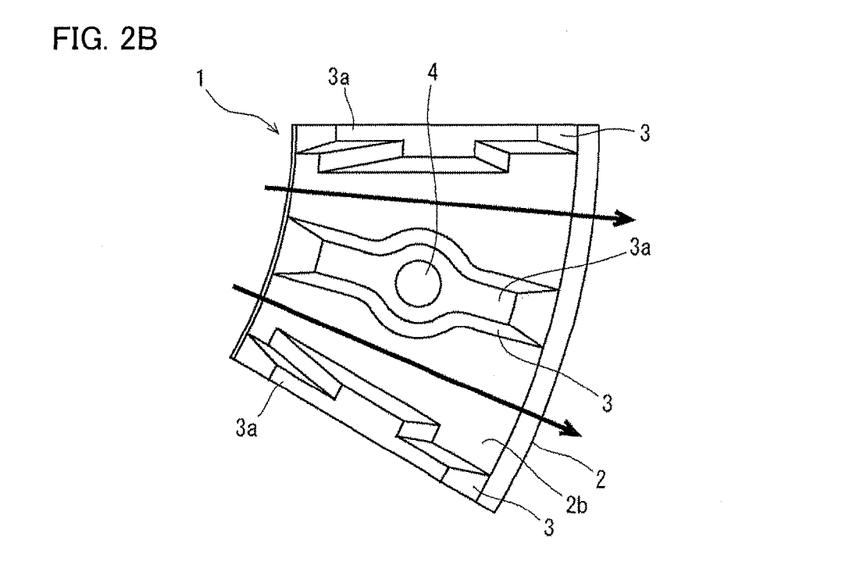
FIG. 2B illustrates a partial plan view in a rear surface view.
Figure 2C:
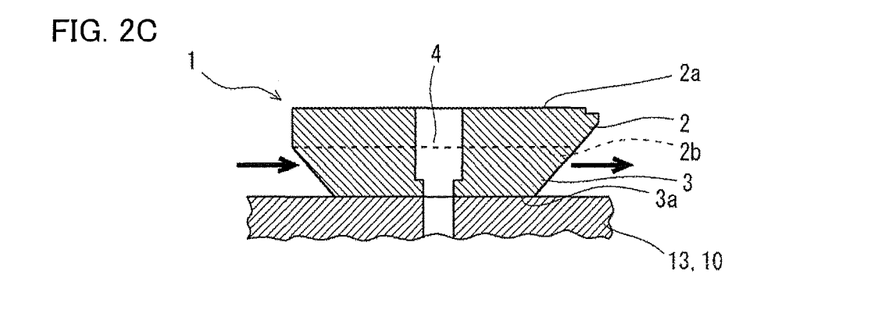
FIG. 2C illustrates a partial cross-sectional view taken along the radial direction.

FIGS. 1A and 1B are diagrams schematically illustrating a mounting structure of a typical railway vehicle brake disc onto a wheel; FIG. 1A illustrates a plan view of a ¼ circular portion in a front surface view; and FIG. 1B illustrates a cross-sectional view taken along the radial direction of a ½ circular portion. FIGS. 2A to 2C are schematic views illustrating a configuration of a railway vehicle brake disc of the related art; FIG. 2A illustrates a partial perspective view when viewed from a rear surface side; FIG. 2B illustrates a partial plan view in a rear surface view; and FIG. 2C illustrates a partial cross-sectional view taken along the radial direction.

As illustrated in FIGS. 1A and 1B and 2A to 2C, a brake disc 1 includes a donut-shaped disc section 2 having a sliding surface on a front surface 2a side. In a rear surface 2b of the disc section 2, a plurality of fin sections 3 is convexly provided in a radial pattern. A bolt hole 4 passing through the disc section 2 is formed almost at a central position in the radial direction in some of the plurality of fin sections 3.

A wheel 10 includes a boss section 11 pressed fit into an axle, a rim section 12 containing a wheel tread which comes into contact with a rail, and a plate section 13 which connects these sections. One set of two brake discs 1 is disposed so as to interpose the plate section 13 of a wheel 10 therebetween in a state where each front surface 2a faces outward; a bolt 15 is inserted into each bolt hole 4; and a nut 16 is fastened to each bolt 15. Thereby, the brake disc 1 is mounted on the wheel 10 in a state where a front end surface 3a of the fin sections 3 are in press contact with the plate section 13 of the wheel 10 over the entire area in the radial direction.

Here, in the case of a high speed railway vehicle such as the Shinkansen running at a speed exceeding 300 km/h, the brake disc 1 rotates integrally with the wheel 10 at a high speed during the running. Accordingly, the ambient air of the brake disc 1 is sucked from an inner peripheral side into a space between the brake disc 1 and the wheel 10, that is, a space surrounded by the disc section 2 and the fin section 3 of the brake disc 1 and the plate section 13 of the wheel 10, and discharged from an outer peripheral side (see solid arrows in FIGS. 2A to 2C). In short, a gas stream of the air is caused between the brake disc 1 and the wheel 10 during the running of the railway vehicle. The gas stream remarkably appears in a high speed running state of more than 300 km/h, and induces noises called aerodynamic noise. Therefore, it is necessary to reduce the aerodynamic noise in views of environmental concerns.

As a solution for such a request, for example, Patent Literature 1 discloses a brake disc in which a rib is added between neighboring fin sections along a circumferential direction, and the gas stream is suppressed by the rib. According to the brake disc disclosed in the above literature, the aerodynamic noise can be reduced to a desired level. However, a problem of lower cooling performance of the brake disc at the time of braking with suppression of the gas stream by the rib becomes apparent.

In addition, in a case where an emergency brake is used in the high speed running state, for example, as described in Patent Literatures 2 and 3, deformation of the brake disc associated with thermal expansion, and a stress load on a fastening bolt due to the deformation increase, and it becomes difficult to secure the durability of the brake disc and the bolt.

CITATION LIST

Patent Literature

Patent Literature 1: Japanese Patent Application Publication (JP-A) No. 2007-205428
Patent Literature 2: JP-A No. 2006-009862
Patent Literature 3: WO 2010/071169

SUMMARY OF INVENTION

Technical Problem

The present invention has been made in view of the above problem, and an object of the present invention is to provide a railway vehicle brake disc which can reduce aerodynamic noise raised during the running at a high speed, improve cooling performance at the time of braking, and furthermore improve durability including that of a fastening bolt.

Solution to Problem

In order to achieve the above object, the present inventors have extensively studied through various experiments and analysis on an assumption that a brake disc is the brake disc illustrated in FIGS. 2A to 2C, that is, a brake disc comprising a donut-shaped disc section having a sliding surface on a front surface side, a plurality of fin sections each convexly provided in a rear surface of the disc section, and a bolt hole passing through the disc section and the fin section, in which the disc section is mounted on a wheel in a state where the fin sections are in press contact with a plate section of the wheel by being fastened with a bolt inserted into the bolt hole. As a result, the present inventors have obtained the following findings (a) to (d).

(a) As described in Patent Literature 3, there is a strong correlation between an air flow rate of the air flowing into the space surrounded by the disc section and the fin section of the brake disc and the plate section of the wheel, and the level of the aerodynamic noise. Here, the air flow rate is obtained by thermal and flow analysis, and the level of the aerodynamic noise is experimentally obtained. Since there is a strong correlation between the air flow rate and the aerodynamic noise level, the aerodynamic noise level can be evaluated using the air flow rate as an index, and the aerodynamic noise may be reduced by reducing the air flow rate. Then, the air flow rate is effectively reduced by increasing a pressure drop in the gas stream, and in order to increase the pressure drop, it is necessary to install a corner portion easily causing the pressure drop or a surface facing a direction of the gas stream in the space raising the gas stream.

(b) It becomes necessary to secure a sufficient area in a pressure drop section of the gas stream space described in (a)

in order to improve the cooling performance. This is because heat transfer to the gas becomes high in the pressure drop section.

Figure 3:
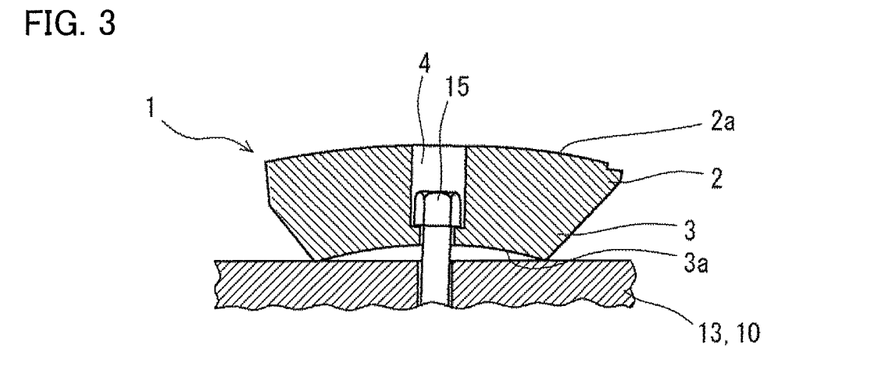
FIG. 3 is a cross-sectional view schematically and exaggeratingly illustrating deformation behavior due to thermal expansion during a period of braking in a brake disc of the related art.

(c) FIG. 3 is a cross-sectional view schematically and exaggeratingly illustrating deformation behavior due to thermal expansion during a period of braking in a brake disc of the related art. At the time of braking, since the brake disc 1 generates heat by friction due to sliding on the brake lining, the disc section 2 and the fin section 3 tend to thermally expand in the radial direction. However, since the fin section 3 is in press contact with the plate section 13 of the wheel 10 over the entire area in the radial direction, the thermal expansion in the radial direction of the fin section 3 is constrained. Therefore, in the case of the brake disc 1 of the related art, as illustrated in FIG. 3, the brake disc 1 deforms in an arch shape about an end on the inner peripheral side and an end on the outer peripheral side of the front end surface 3a of the fin section 3 as supporting points.

Then, a tensile stress is loaded on the fastening bolt 15, and a bending stress is further loaded thereon. In addition, as the braking is repeated, the brake disc 1 repeats the thermal expansion at the time of braking and the contraction due to cooling after the braking, and thus plastically deforms in a warped state.

In order to reduce the deformation associated with the thermal expansion of such a brake disc, it becomes necessary to alleviate the constraint on the thermal expansion of the fin section during a period of braking and to substantially allow the thermal expansion/contraction in the radial direction of the fin section.

(d) Based on the above findings (a) to (c), without newly installing the rib as in the brake disc disclosed in Patent Literature 1, in the fin section a groove may be formed along a circumferential direction in at least one of the area on the inner peripheral side and the area on the outer peripheral side of the bolt hole when viewed in the radial direction of the disc section. Further, the groove may be formed along the circumferential direction in the area on the inner peripheral side and the area on the outer peripheral side. This is because, by forming the groove in the fin section, the pressure drop section as indicated above in (a) and (b) is naturally installed, and the thermal expansion/contraction in the radial direction of the fin section as indicated above in (c) is substantially allowed.

The present invention has been completed based on the findings described above in (a) to (d), and a gist thereof is to provide the following railway vehicle brake disc.

That is, the railway vehicle brake disc of the present invention is a railway vehicle brake disc comprising a donut-shaped disc section having a sliding surface on a front surface side, a plurality of fin sections each convexly provided in a rear surface of the disc section in a radial pattern, and a bolt hole passing through the disc section and the fin section, in which the disc section is mounted on a wheel in a state where the fin sections are in press contact with a plate section of the wheel by being fastened with a bolt inserted into the bolt hole, characterized in that the fin section has a groove formed along a circumferential direction in at least one of an area on an inner peripheral side and an area on an outer peripheral side of the bolt hole when viewed in a radial direction of the disc section.

In the above invention, a surface on an outer peripheral side of the groove is preferably a plane or a concave surface.

In addition, in the present invention, the fin section has the groove preferably formed along the circumferential direction in the area on the inner peripheral side and the area on the outer peripheral side.

In the brake disc, a ratio h/H of a depth "h" of the groove to a height H of the fin section preferably falls within a range of 0.2 to 0.8.

In addition, in the brake disc, a width in the circumferential direction of the area on the outer peripheral side of the fin section is preferably larger than a width in the circumferential direction of the area on the inner peripheral side of the fin section.

In addition, the railway vehicle brake disc of the present invention is a railway vehicle brake disc comprising a donut-shaped disc section having a sliding surface on a front surface side, a plurality of fin sections each convexly provided in a rear surface of the disc section in a radial pattern, and a bolt hole passing through the disc section and the fin section, in which the disc section is mounted on a wheel in a state where the fin sections are in press contact with a plate section of the wheel by being fastened with a bolt inserted into the bolt hole, characterized in that the fin section has a groove formed along a circumferential direction in an area on an inner peripheral side and an area on an outer peripheral side in a radial direction which interpose the bolt hole therebetween.

Advantageous Effects of Invention

According to the railway vehicle brake disc of the present invention, since the groove is formed along the circumferential direction in the fin section having the bolt hole formed therein, the aerodynamic noise raised during the running at a high speed can be reduced, the cooling performance of the brake disc at the time of braking can be improved, and furthermore the durability of the brake disc including that of a fastening bolt can be improved.

BRIEF DESCRIPTION OF DRAWINGS

FIGS. 1A and B are diagrams schematically illustrating a mounting structure of a typical railway vehicle brake disc onto a wheel.

FIGS. 2A to 2C are schematic views illustrating a configuration of a railway vehicle brake disc of the related art.

FIGS. 4A to 4C are schematic diagrams illustrating an example of a configuration of a railway vehicle brake disc according to a second embodiment of the present invention.

FIGS. 7A to 7C are schematic views illustrating an example of a configuration of a railway vehicle brake disc according to a third embodiment of the present invention;

FIGS. 9A to 9C are schematic views illustrating an example of a configuration of a railway vehicle brake disc according to a first embodiment of the present invention.

DESCRIPTION OF EMBODIMENTS

A railway vehicle brake disc according to the present invention is a railway vehicle brake disc comprising a donut-shaped disc section having a sliding surface on a front surface side, a plurality of fin sections each convexly provided in a rear surface of the disc section in a radial pattern, and a bolt hole passing through the disc section and the fin section, in which the disc section is mounted on a wheel in a state where the fin sections are in press contact with a plate section of the wheel by being fastened with a bolt inserted into the bolt hole, characterized in that the fin section has a groove formed along a circumferential direction in at least one of an area on an inner peripheral side and an area on an outer peripheral side of the bolt hole when viewed in a radial direction of the disc section.

Hereinafter, embodiments of the railway vehicle brake disc according to the present invention will be described.

In the present invention, the groove may be formed along the circumferential direction only in the area on the inner peripheral side in the fin section, may be formed along the circumferential direction only in the area on the outer peripheral side in the fin section, and may be formed along the circumferential direction in both of the area on the inner peripheral side and the area on the outer peripheral side in the fin section.

Hereinafter, an aspect in which the groove is formed along the circumferential direction in one of the area on the inner peripheral side or the area on the outer peripheral side in the fin section will be described as a first embodiment, an aspect in which the groove is formed along the circumferential direction in both of the area on the inner peripheral side and the area on the outer peripheral side in the fin section will be described as a second embodiment, and an aspect in which the width in the circumferential direction of the area on the outer peripheral side in the fin section is larger than the width in the circumferential direction of the area on the inner peripheral side of the fin section will be described as a third embodiment.

Incidentally, in the present specification, the railway vehicle disc brake may be simply referred to as a disc brake.

First Embodiment

Figure 9A:
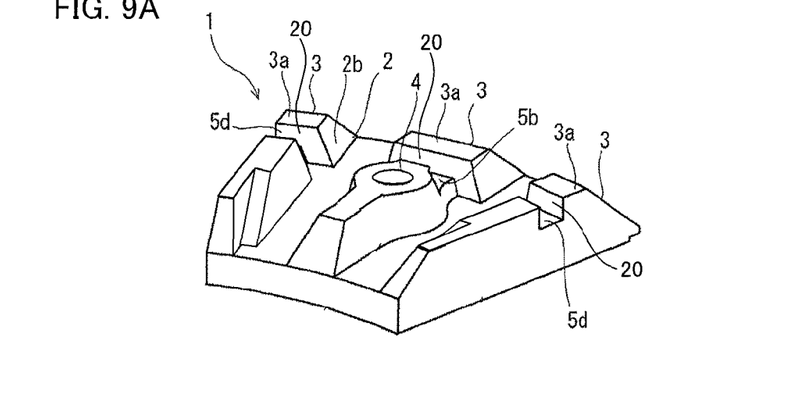
FIG. 9A illustrates a partial perspective view when viewed from a rear surface side.
Figure 9B:
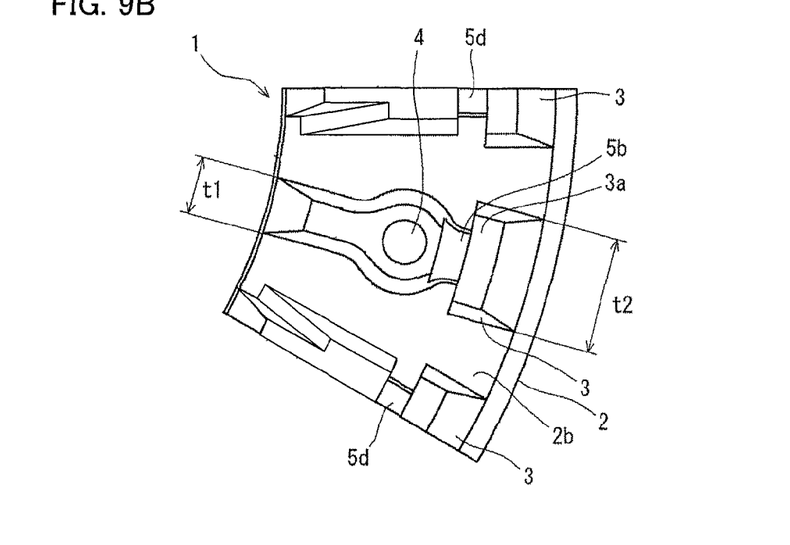
FIG. 9B illustrates a partial plan view in a rear surface view.
Figure 9C:
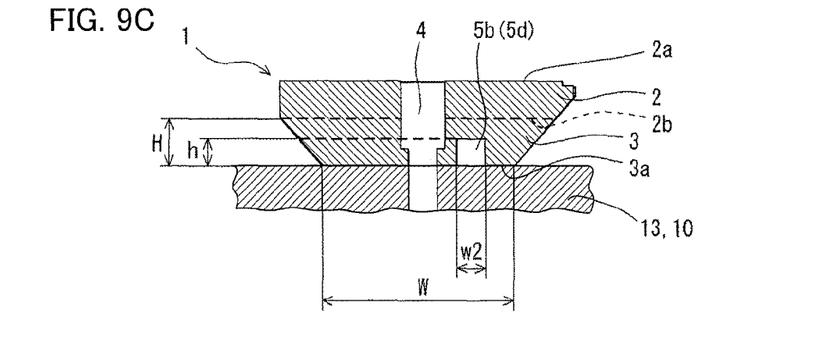
FIG. 9C illustrates a partial cross-sectional view taken along the radial direction.

FIGS. 9A to 9C are schematic views illustrating an example of a configuration of a railway vehicle brake disc according to a first embodiment of the present invention; FIG. 9A illustrates a partial perspective view when viewed from a rear surface side; FIG. 9B illustrates a partial plan view in a rear surface view; and FIG. 9C illustrates a partial cross-sectional view taken along the radial direction. Incidentally, in FIGS. 9A and 9B, a 1/12 circular portion of the brake disc is representatively illustrated.

As illustrated in FIGS. 9A to 9C, a brake disc 1 of the first embodiment comprises a donut-shaped disc section 2 having a sliding surface on a front surface 2a side. In a rear surface 2b of the disc section 2, a plurality of fin sections 3 is convexly provided in a radial pattern. A bolt hole 4 passing through the disc section 2 is formed almost at a central position in the radial direction in some of the plurality of fin sections 3.

In a fin section 3 having the bolt hole 4 formed therein, a groove 5b is formed along the circumferential direction in the area on the outer peripheral side of the bolt hole 4 when viewed in the radial direction of the disc section 2. Further, in a fin section 3 having no bolt hole 4 formed therein, a similar groove 5d is also formed on the same circumference as the groove 5b.

As illustrated in FIGS. 1A and B, one set of two brake discs 1 having such a configuration is disposed so as to interpose a plate section 13 of a wheel 10 therebetween in a state where each front surface 2a faces outward; a bolt 15 is inserted into each bolt hole 4; and a nut 16 is fastened to each bolt 15. Thereby, the brake disc 1 is mounted on the wheel 10 in a state where a front end surface 3a of the fin section 3 is in press contact with the plate section 13 of the wheel 10 except the areas where the grooves 5b and 5d are formed.

In the brake disc 1 of the first embodiment, since the groove 5b is formed along the circumferential direction in the fin section 3 having the bolt hole 4 formed therein, a corner portion of the groove 5b and a surface 20 on an outer peripheral side of the groove 5b serve as a pressure drop section of a gas stream. Therefore, an air flow rate of the air flowing into a space raising the gas stream is reduced, and as a result, aerodynamic noise raised during the running at a high speed can be reduced. Moreover, since the pressure drop section is widely formed by the groove 5b along the circumferential direction, it becomes possible to sufficiently secure the area of the pressure drop section in which heat transfer to gas becomes high, and as a result, cooling performance of the brake disc 1 at the time of braking can be improved. These effects are enhanced still more by also forming the groove 5d in the fin section 3 having no bolt hole 4 formed therein.

Furthermore, since the groove 5b is formed along the circumferential direction in the fin section 3 having the bolt hole 4 formed therein, the groove 5b can allow the thermal expansion/contraction in the radial direction of the fin section 3. Therefore, since constraints on the thermal expansion of the fin section 3 is alleviated during a period of braking and deformation associated with the thermal expansion of the brake disc 1 is reduced, stress loads on a fastening bolt and the brake disc 1 are relieved, and as a result, the durability of the brake disc 1 including that of the fastening bolt can be improved.

Further, in the brake disc 1 of the first embodiment, since the groove 5b may be formed in the fin section 3 without newly installing a rib as in the brake disc disclosed in Patent Literature 1, there is also an advantage of a simple configuration and excellent productivity. In addition, it becomes possible to reduce the weight of the brake disc 1 by forming the groove 5b in the fin section 3.

Incidentally, in FIGS. 9A to 9C, the fin section has the groove formed along the circumferential direction in the area on the outer peripheral side of the bolt hole when viewed in the radial direction of the disc section, but the present invention is not limited thereto. In the fin section, the groove may be formed along the circumferential direction in the area on the inner peripheral side of the bolt hole when viewed in the radial direction of the disc section. Even in a case where the groove is formed along the circumferential direction in the area on the inner peripheral side in the fin section, the same effects as those described above are obtained.

In a case where the groove is formed along the circumferential direction in one of the area on the inner peripheral side or the area on the outer peripheral side in the fin section, an area where the groove is formed may be one of the area on the inner peripheral side and the area on the outer peripheral side in the fin section. Incidentally, the aerodynamic noise is efficiently reduced by forming the groove in the area on the inner peripheral side. This is because, in general, a flow path on the inner peripheral side is narrower and thus a large pressure drop can be given. In addition, when the cooling performance is secured in priority, the cooling performance is effectively secured by forming the groove in the area on the outer peripheral side. This is because the surface area can be easily expanded while the pressure drop is given.

In addition, in a case where the brake disc comprises the fin section having the bolt hole formed therein and the fin section having no bolt hole therein, the groove may be formed along the circumferential direction at least in the fin section having the bolt hole formed therein. In particular, it is preferable that the groove be formed along the circumferential direction in both of the fin section having the bolt hole formed therein and the fin section having no bolt hole formed therein. By also forming the groove in the fin section having no bolt hole formed therein as described above, the aerodynamic noise raised during the running at a high speed can be reduced still more, and the cooling performance of the brake disc at the time of braking can be improved still more.

The shape of the groove formed in the fin section is not particularly limited.

In particular, since the surface on the outer peripheral side of the groove serves as the surface facing the direction of the gas stream and serves as the pressure drop section, the surface on the outer peripheral side of the groove is preferably a plane or a concave surface. In a case where the surface on the outer peripheral side of the groove is a convex surface, the surface facing the direction of the gas stream is difficult to be formed, and the corner portion of the groove is also rounded or lost in the surface on the outer peripheral side of the groove, so that there is concern that the area of the pressure drop section is not sufficiently secured. On the other hand, in a case where the surface on the outer peripheral side of the groove is a plane or a concave surface, the surface facing the direction of the gas stream is easily formed, the corner portion of the groove is also easily formed in the surface on the outer peripheral side of the groove, and the area of the pressure drop section can be sufficiently secured. In addition, in a case where the surface on the outer peripheral side of the groove is a concave surface, the surface facing the direction of the gas stream can be made large, and the pressure drop section can also be increased. Therefore, the aerodynamic noise raised during the running at a high speed can be reduced still more, and the cooling performance of the brake disc at the time of braking can be improved still more.

Here, in the surface on the outer peripheral side of the groove, the concave surface means a surface having a concave shape denting toward the outer peripheral side of the disc section, and the convex surface means a surface having a convex shape protruding toward the inner peripheral side of the disc section.

On the other hand, a surface on an inner peripheral side of the groove may be any of the plane, the concave surface, or the convex surface. In a case where the surface on the inner peripheral side of the groove is the plane or the concave surface, the corner portion of the groove easily causing the pressure drop is easily formed in a similar manner to the above case.

Here, in the surface on the inner peripheral side of the groove, the concave surface means a surface having a concave shape denting toward the inner peripheral side of the disc section, and the convex surface means a surface having a convex shape protruding toward the outer peripheral side of the disc section.

In addition, in a case where the groove 5b is formed along the circumferential direction in the area on the outer peripheral side in the fin section 3 as illustrated in FIG. 9B, a width t2 in the circumferential direction of the area on the outer peripheral side in the fin section 3 is preferably larger than the diameter of the bolt hole 4. Since the length in the circumferential direction of the groove 5b formed in the area on the outer peripheral side in the fin section 3 becomes long, the pressure drop section is expanded. Therefore, the aerodynamic noise raised during the running at a high speed can be reduced, and the cooling performance of the brake disc 1 at the time of braking can be improved.

In addition, while not illustrated in the figures, in a case where the groove is formed along the circumferential direction in the area on the inner peripheral side in the fin section, a width t1 in the circumferential direction of the area on the inner peripheral side in the fin section 3 as illustrated in FIG. 9B is preferably larger than the diameter of the bolt hole 4. The same effects as those described above are also obtained in this case.

As illustrated in FIG. 9C, depths "h" of the grooves 5b and 5d in a direction from the front end surface 3a of the fin section 3 toward the rear surface 2b of the disc section 2 may be equal to or different from each other.

In addition, as illustrated in FIG. 9C, assuming that the depth of the groove 5b, 5d in the direction from the front end surface 3a of the fin section 3 toward the rear surface 2b of the disc section 2 is "h", and the height of the fin section 3 from the rear surface 2b of the disc section 2 to the front end surface 3a of the fin section 3 is H, a ratio h/H of the depth "h" of the groove 5b, 5d to the height H of the fin section 3 preferably falls within a range of 0.2 to 0.8. More preferably, the ratio falls within a range of 0.4 to 0.8. This is because when the ratio h/H falls within the above range, the air flow rate becomes small, a heat dissipation rate becomes large, the aerodynamic noise level is lowered, and thus the cooling performance becomes excellent. Incidentally, the reason will be described in the following second embodiment, and the explanation thereof is omitted here.

In addition, in FIG. 9C, in the fin section the groove is formed along the circumferential direction in the area on the outer peripheral side of the bolt hole when viewed in the radial direction of the disc section. However, similarly, in a case where the groove is formed along the circumferential direction in the area on the inner peripheral side in the fin section, the ratio h/H of the depth "h" of the groove to the height H of the fin section preferably falls within the above range.

As illustrated in FIG. 9C, widths w2 in the radial direction of the grooves 5b and 5d formed in the fin section 3 may be equal to or different from each other.

In addition, as illustrated in FIG. 9C, assuming that the width in the radial direction of the groove 5b, 5d formed in the fin section 3 is w2 and the entire length in the radial direction of the front end surface 3a of the fin section 3 is W, a ratio w2/W of the width w2 in the radial direction of the groove 5b, 5d to the entire length W in the radial direction of the front end surface 3a of the fin section 3 is preferably equal to or more than 0.05. This is because when the ratio w2/W falls within the above range, the air flow rate becomes small, the heat dissipation rate becomes large, the aerodynamic noise level is lowered, and thus the cooling performance becomes excellent. In addition, an upper limit of the ratio w2/W is preferably set to be equal to or less than 0.3 in order to secure a reinforcing effect of the fin section on the brake disc.

As a material of the brake disc, cast iron, cast steel, forged steel, aluminum, carbon, and the like can be employed.

Second Embodiment

Figure 4A:
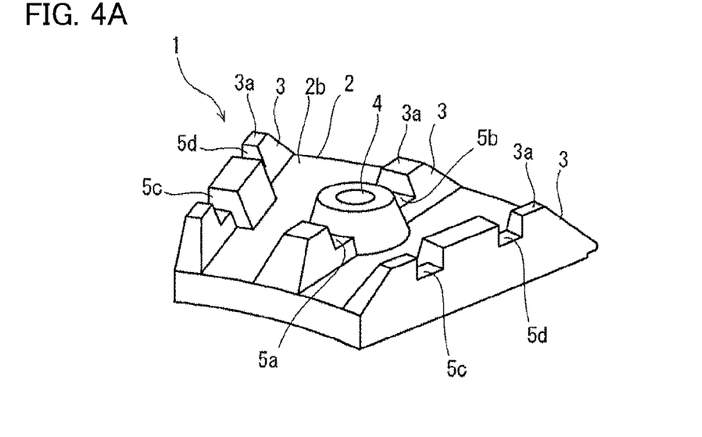
FIG. 4A illustrates a partial perspective view when viewed from a rear surface side.
Figure 4B:
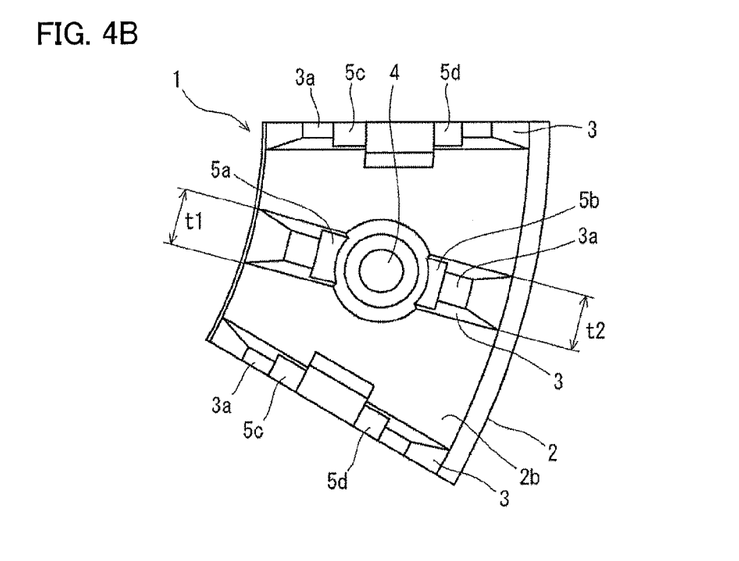
FIG. 4B illustrates a partial plan view in a rear surface view.
Figure 4C:
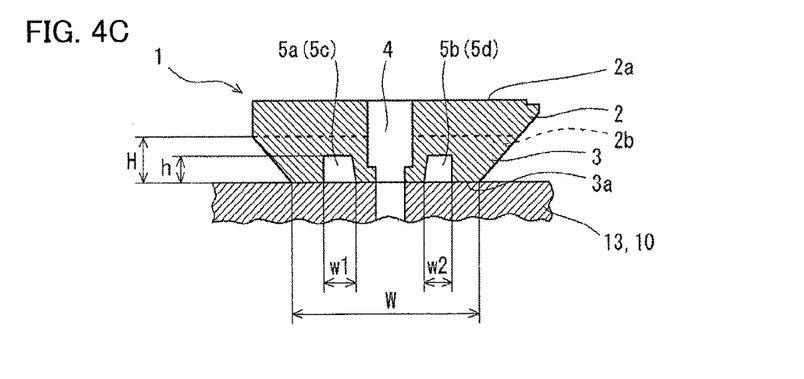
FIG. 4C illustrates a partial cross-sectional view taken along the radial direction.

FIGS. 4A to 4C are schematic diagrams illustrating an example of a configuration of a railway vehicle brake disc according to a second embodiment of the present invention; FIG. 4A illustrates a partial perspective view when viewed from a rear surface side; FIG. 4B illustrates a partial plan view in a rear surface view; and FIG. 4C illustrates a partial cross-sectional view taken along the radial direction. Incidentally, in FIGS. 4A and 4B, a 1/12 circular portion of the brake disc is representatively illustrated.

As illustrated in FIGS. 4A to 4C, a brake disc 1 of the second embodiment includes a donut-shaped disc section 2 having a sliding surface on a front surface 2a side. In a rear surface 2b of the disc section 2, a plurality of fin sections 3 is convexly provided in a radial pattern. A bolt hole 4 passing through the disc section 2 is formed almost at a central position in the radial direction in some of the plurality of fin sections 3.

In a fin section 3 having the bolt hole 4 formed therein, grooves 5a and 5b are formed along the circumferential direction in an area on an inner peripheral side and an area on an outer peripheral side in the radial direction which interpose the bolt hole 4 therebetween, that is, in an area on an inner peripheral side and an area on an outer peripheral side of the bolt hole 4 when viewed in the radial direction of the disc section 2. In the fin section 3, a width t1 in the circumferential direction of the area on the inner peripheral side and a width t2 in the circumferential direction of the area on the outer peripheral side are equal to each other. Further, in a fin section 3 having no bolt hole 4 formed therein, grooves 5c and 5d similar to the grooves 5a and 5b are also formed on the same circumference as the grooves 5a and 5b.

As illustrated in FIGS. 1A and B, one set of two brake discs 1 having such a configuration is disposed so as to interpose a plate section 13 of a wheel 10 in a state where each front surface 2a faces outward; a bolt 15 is inserted into each bolt hole 4; and a nut 16 is fastened to each bolt 15. Thereby, the brake disc 1 is mounted on the wheel 10 in a state where a front end surface 3a of the fin sections 3 are in press contact with the plate section 13 of the wheel 10 except the areas where the grooves 5a to 5d are formed.

The brake disc of the second embodiment obtains the same effects as those of the brake disc of the first embodiment. Particularly, since the grooves are formed along the circumferential direction in both of the area on the inner peripheral side and the area on the outer peripheral side in the fin section, the above effects can be enhanced still more.

That is, in the brake disc 1 of the second embodiment, since the grooves 5a and 5b are formed along the circumferential direction in the fin section 3 having the bolt hole 4 formed therein, corner portions of the grooves 5a and 5b and surfaces on outer peripheral sides of the grooves 5a and 5b serve as a pressure drop section of a gas stream. Therefore, an air flow rate of the air flowing into a space raising the gas stream is reduced, and as a result, the aerodynamic noise raised during the running at a high speed can be reduced. Moreover, since the pressure drop section is widely formed by the grooves 5a and 5b along the circumferential direction, it becomes possible to sufficiently secure the area of the pressure drop section in which heat transfer to gas becomes high, and as a result, cooling performance of the brake disc 1 at the time of braking can be improved. These effects are enhanced still more by also forming the grooves 5c and 5d in the fin section 3 having no bolt hole 4 formed therein.

Furthermore, since in the fin section 3 having the bolt hole 4 formed therein the grooves 5a and 5b are formed along the circumferential direction while interposing the bolt hole 4 therebetween, the grooves 5a and 5b can allow the thermal expansion/contraction in the radial direction of the fin section 3. Therefore, since constraints on the thermal expansion of the fin section 3 is alleviated during a period of braking and deformation associated with the thermal expansion of the brake disc 1 is reduced, stress loads on a fastening bolt and the brake disc 1 are relieved, and as a result, the durability of the brake disc 1 including that of the fastening bolt can be improved.

Further, in the brake disc 1 of the second embodiment, since the grooves 5a and 5b may be formed in the fin section 3 without newly installing the rib as in the brake disc disclosed in Patent Literature 1, there is also an advantage of a simple configuration and excellent productivity. In addition, it becomes possible to reduce the weight of the brake disc 1 by forming the grooves 5a and 5b in the fin section 3.

Preferable aspects in the second embodiment are same as those in the first embodiment.

That is, in a case where the brake disc includes the fin section having the bolt hole formed therein and the fin section having no bolt hole therein, the groove may be formed along the circumferential direction at least in the fin section having the bolt hole formed therein. In particular, it is preferable that the groove be also formed along the circumferential direction in the fin section having no bolt hole formed therein.

In the brake disc 1 of the second embodiment, the shapes of the grooves 5a to 5d formed in the fin section 3 are not particularly limited.

In particular, in a similar manner to the first embodiment, the surface on the outer peripheral side of the groove is preferably a plane or a concave surface. On the other hand, a surface on an inner peripheral side of the groove may be any of a plane, a concave surface, or a convex surface.

In addition, as illustrated in FIG. 4B, a width t1 in the circumferential direction of the area on the inner peripheral side and a width t2 in the circumferential direction of the area on the outer peripheral side in the fin section 3 are preferably larger than the diameter of the bolt hole 4. Since the length in the circumferential direction of the groove 5a, 5b formed in the fin section 3 becomes long, the pressure drop section is expanded. Therefore, the aerodynamic noise raised during the running at a high speed can be reduced, and the cooling performance of the brake disc 1 at the time of braking can be improved.

As illustrated in FIG. 4C, depths "h" of the grooves 5a to 5d in a direction from the front end surface 3a of the fin section 3 toward the rear surface 2b of the disc section 2 may be equal to or different from each other.

In addition, as illustrated in FIG. 4C, assuming that each of the depths of the grooves 5a to 5d in the direction from the front end surface 3a of the fin section 3 toward the rear surface 2b of the disc section 2 is "h", and the height of the fin section 3 from the rear surface 2b of the disc section 2 to the front end surface 3a of the fin section 3 is H, a ratio h/H of each of the depths "h" of the grooves 5a to 5d to the height H of the fin section 3 preferably falls within a range of 0.2 to 0.8. More preferably, the ratio falls within a range of 0.4 to 0.8. The reason is as follows.

Figure 5:
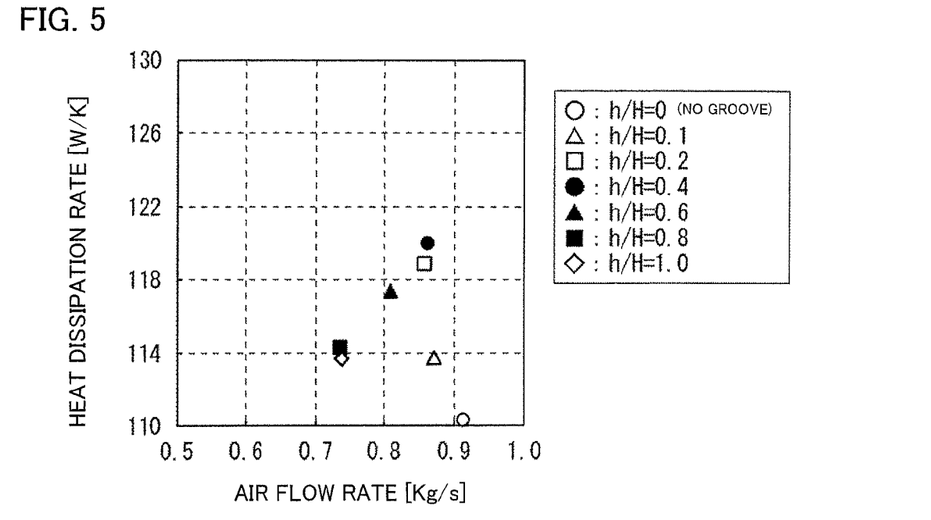
FIG. 5 is a diagram illustrating an influence of the depth of a groove in a fin section on an air flow rate and cooling performance.

FIG. 5 is a diagram illustrating an influence of the depth of the groove in the fin section on an air flow rate and cooling performance. In the figure, the air flow rate indicated in the horizontal axis is obtained through thermal and flow analysis, and has a strong correlation with the aerodynamic noise level, and thus is used as an evaluation index of the aerodynamic noise level. This means that, as the air flow rate is smaller, the aerodynamic noise level is lower. In addition, the heat dissipation rate indicated in the vertical axis is an integrated value of an averaged heat transfer coefficient on the brake disk surface obtained as a result of performing the thermal and flow analysis on the assumption of a steady running at 360 km/h and the surface area per brake disk, and is used as the evaluation index of the cooling performance of the brake disc. This means that, as the heat dissipation rate is larger, the cooling performance is more excellent.

Representative conditions for a model of the brake disc used in the analysis are as follows.
  Material: Forged Steel
  Inner Diameter of Disc Section: 417 mm, Outer Diameter of Disc Section: 715 mm
  Total Height from Sliding Surface of Disc Section to Front End Surface of Fin Section: 45 mm
  Fastening with Bolt: 12 bolt holes centered on the same circumference having a diameter of 560 mm are formed at equal angular intervals, and a bolt is inserted into each bolt hole to fasten the brake disc and the wheel.

Here, the ratio h/H was changed to 0 (no groove), 0.1, 0.2, 0.4, 0.6, 0.8, and 1.0. In addition, as illustrated in FIG. 4C, assuming that the width in the radial direction of the groove $5a$, $5c$ on the inner peripheral side formed in the fin section 3 was w1, the width in the radial direction of the groove $5b$, $5d$ on the outer peripheral side was w2, and the entire length in the radial direction of the front end surface $3a$ of the fin section 3 was W, a ratio "(w1+w2)/W" of the total width "w1+w2" of the grooves $5a$ to $5d$ to the entire length W of the front end surface $3a$ of the fin section 3 was set to be a constant of 0.3.

As illustrated in FIG. 5, when the ratio h/H falls within a range of 0.2 to 0.8, the air flow rate becomes small, the heat dissipation rate becomes large, the aerodynamic noise level is lowered, and thus it is obvious that the cooling performance becomes excellent. However, in a case where the ratio h/H is 0.2, since the heat dissipation rate is smaller than that in the case where the ratio h/H is 0.4 when the air flow rate becomes almost the same degree, it is preferable that a lower limit of the ratio h/H be equal to or more than 0.4. In addition, in a case where the ratio h/H is 1.0, that is, a case where the depth "h" of the groove and the height H of the fin section are equal to each other, since the fin section is completely absent in the groove, the case becomes inappropriate in that the reinforcing effect of the fin section on the brake disc is degraded.

As illustrated in FIG. 4C, the widths w1 and w2 in the radial direction of the grooves $5a$ to $5d$ formed in the fin section 3 may be equal to or different from each other.

In addition, the ratio "(w1+w2)/W" of the total width "w1+w2" of the groove $5a$, $5c$ on the inner peripheral side and the groove $5b$, $5d$ on the outer peripheral side formed in the fin section 3 to the entire length W of the front end surface $3a$ of the fin section 3 is preferably equal to or more than 0.1. More preferably, the ratio is equal to or more than 0.15. The reason is as follows.

Figure 6:
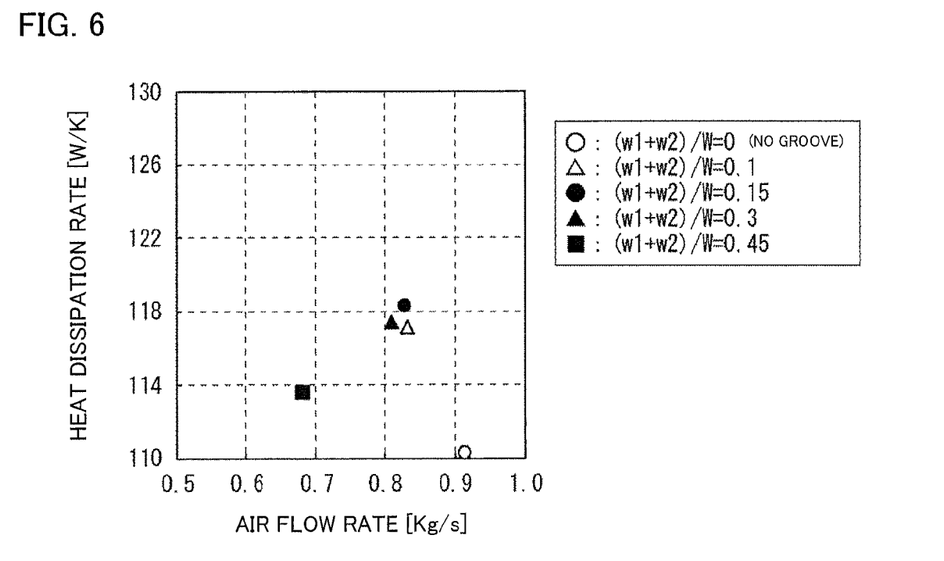
FIG. 6 is a diagram illustrating an influence of the width in the radial direction of the groove in the fin section on the air flow rate and the cooling performance.

FIG. 6 is a diagram illustrating an influence of the width of the groove in the fin section on the air flow rate and the cooling performance. In the figure, the air flow rate and the heat dissipation rate indicated respectively in the horizontal axis and the vertical axis are the same as those in FIG. 5. Representative conditions for a model of the brake disc used in the analysis are also the same as those described above, but here the ratio "(w1+w2)/W" was changed to 0 (no groove), 0.1, 0.15, 0.3, and 0.45. In addition, the ratio h/H was set to be a constant of 0.6.

As illustrated in FIG. 6, when the ratio "(w1+w2)/W" is equal to or more than 0.1, the air flow rate becomes small, the heat dissipation rate becomes large, and the aerodynamic noise level is lowered, and thus it is obvious that the cooling performance becomes excellent. However, in a case where the ratio "(w1+w2)/W" is 0.1, since the heat dissipation rate is smaller than that in the case where the ratio "(w1+w2)/W" is 0.15 when the air flow rate becomes almost the same degree, the ratio "(w1+w2)/W" is preferably equal to or more than 0.15. In addition, an upper limit of the ratio "(w1+w2)/W" is preferably equal to or less than 0.6 in order to secure the reinforcing effect of the fin section on the brake disc.

A material of the brake disc 1 is the same as in the first embodiment. The material as a representative condition of the model of the brake disc used in the above analysis was the forged steel, but the same effect can be obtained regardless of the material.

Third Embodiment

Figure 7A:
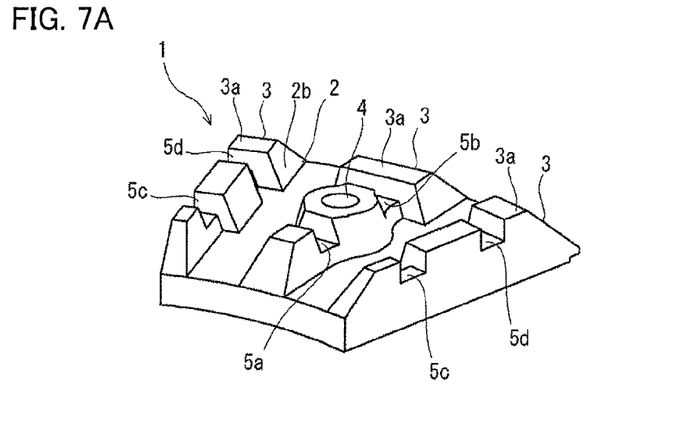
FIG. 7A illustrates a partial perspective view when viewed from a rear surface side.
Figure 7B:
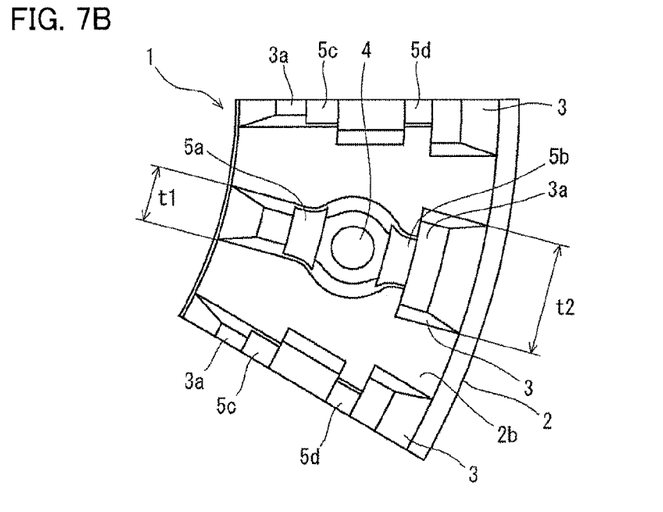
FIG. 7B illustrates a partial plan view in a rear surface view.
Figure 7C:
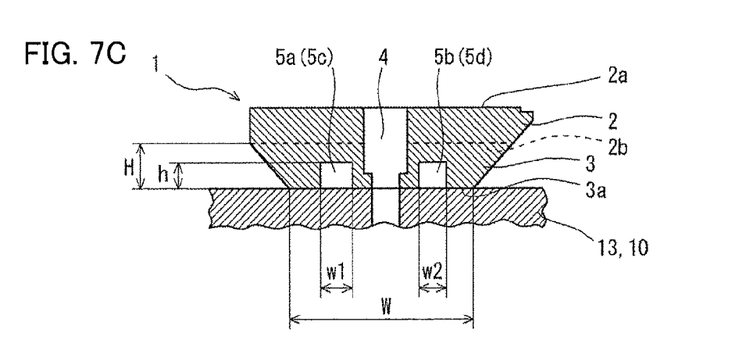
FIG. 7C illustrates a partial cross-sectional view taken along the radial direction.

FIGS. 7A to 7C are schematic views illustrating an example of a configuration of a railway vehicle brake disc according to a third embodiment of the present invention; FIG. 7A illustrates a partial perspective view when viewed from a rear surface side; FIG. 7B illustrates a partial plan view in a rear surface view; and FIG. 7C illustrates a partial cross-sectional view taken along the radial direction. Incidentally, FIGS. 7A and 7B representatively illustrate a 1/12 circular portion of the brake disc in a similar manner to FIGS. 4A and 4B.

The brake disc of the third embodiment illustrated in FIGS. 7A to 7C has the same basic configuration as the brake disc of the second embodiment illustrated in FIGS. 4A to 4C, but is different from the brake disc of the second embodiment in the following points. That is, as illustrated in FIGS. 7A to 7C, in a fin section 3 of the third embodiment, a width t2 in the circumferential direction of an area on an outer peripheral side is made larger than a width t1 in the circumferential direction of an area on an inner peripheral side.

In a brake disc 1 of the third embodiment, since the length in the circumferential direction of groove $5b$, $5d$ on the outer peripheral side formed in the fin section 3 is longer than that of the brake disc 1 of the second embodiment, the pressure drop section is expanded. Therefore, the aerodynamic noise raised during the running at a high speed can be reduced still more, and the cooling performance of the brake disc 1 at the time of braking can be improved.

In addition, in a similar manner to the brake disc illustrated in FIGS. 7A to 7C, the brake disc illustrated in FIGS. 9A to 9C has the fin section 3 in which the width t2 in the circumferential direction of the area on the outer peripheral side is made larger than the width t1 in the circumferential direction of the area on the inner peripheral side.

In a similarly manner to the above, since the length in the circumferential direction of the groove $5b$ formed in the area on the outer peripheral side in the fin section 3 also becomes long in this case, the pressure drop section is expanded. Therefore, the aerodynamic noise raised during the running at a high speed can be reduced, and the cooling performance of the brake disc 1 at the time of braking can be improved.

Figure 8:
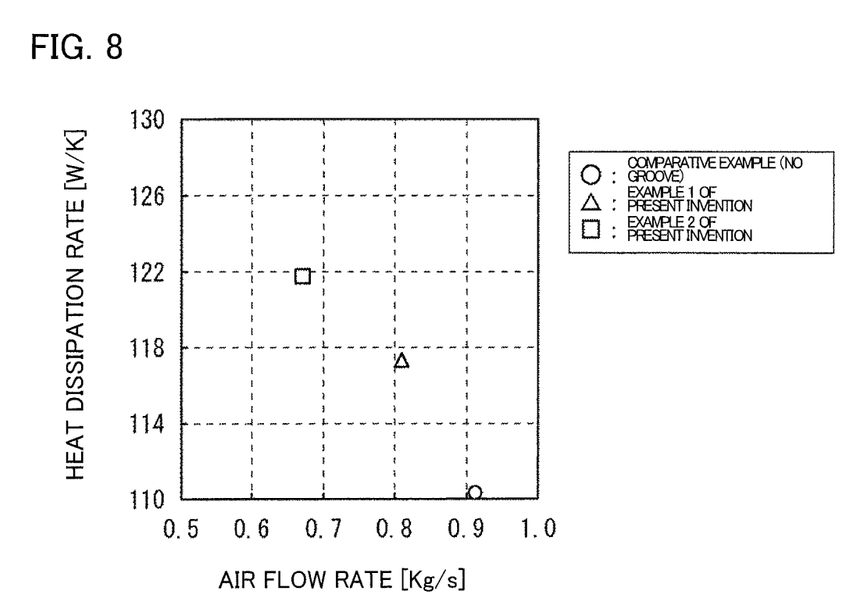
FIG. 8 is a diagram illustrating an influence of the width in the circumferential direction of the fin section on the air flow rate and the cooling performance.

FIG. 8 is a diagram illustrating an influence of the width in the circumferential direction of the fin section on the air flow rate and the cooling performance. In the figure, the air flow rate and the heat dissipation rate indicated respectively in the horizontal axis and the vertical axis are the same as those illustrated in FIG. 5. Representative conditions for a model of the brake disc used in analysis are also the same as those described above. Here, a brake disc in which the width in the circumferential direction of the fin section was set to be a constant of 27 mm (corresponding to the second embodiment) was used as Example 1 of the present invention, and a brake disc in which the widths in the circumferential direction of the fin section were set such that the width (54 mm) on the outer peripheral side was larger than the width (27 mm) on the inner peripheral side of the fin section (corresponding to the third embodiment) was used as Example 2 of the present invention. In the above both examples, a ratio h/H was set to be a constant of 0.6 and a ratio "(w1+w2)/W" was set to be a constant of 0.3. In addition, a brake disc in which no groove was formed in the fin section and the width in the circumferential direction of the fin section was set to be a constant of 27 mm was used for comparison.

As in Example 2 of the present invention indicated by a white rectangular mark in FIG. 8, when the width in the circumferential direction of the fin section is made larger in the outer peripheral side than that on the inner peripheral side, it is obvious that both the reduction in the aerodynamic noise level and the improvement in the cooling performance become remarkable.

In addition, in the third embodiment, the stress loads on a fastening bolt and the brake disc are also relieved, and it becomes possible to improve the durability of the brake disc including that of the fastening bolt. The analysis results which prove the effects are shown in the following Table 1.

TABLE 1

|  | Comparative Example | Example 2 of Present Invention |
|---|---|---|
| Tensile Stress Variation of Bolt [Mpa] | 280 (1) | 216 (0.77) |
| Bending Stress Variation of Bolt [Mpa] | 59 (1) | 7 (0.12) |
| Deformation Amount of Disc (Warp) [mm] | 0.022 (1) | 0.012 (0.55) |

Note)
A numerical value in parentheses ( ) means a relative value based on a numerical value of the comparative example Here, deformation analysis was performed by FEM using models having the same conditions as those in Example 2 of the present invention and the comparative example illustrated in FIG. 8, a bending stress variation and a tensile stress variation of the fastening bolt were calculated, and a deformation amount of the brake disc was further calculated. Among them, the stress variation of the fastening bolt was obtained by assuming a case where an emergency brake was used once during the running at 360 km/h, and determining a stress variation generated in the bolt in that case (maximum stress−minimum stress). In addition, the deformation amount of the brake disc was obtained by assuming a case where the emergency brake was used three times during the running at 360 km/h and thereafter the brake disc was cooled, and determining a warp of the brake disc after the cooling (a maximum value of displacement in the axial direction with respect to the initial state).

It can be seen from the result shown in Table 1 that, in Example 2 of the present invention corresponding to the third embodiment, both the stress variation of the fastening bolt and the deformation amount of the brake disc become small and the durability of the brake disc including that of the fastening bolt is improved compared to the comparative example in which no groove is formed in the fin section.

INDUSTRIAL APPLICABILITY

The railway vehicle brake disc of the present invention can be effectively applied to any disc brake of the railway vehicle, and is particularly useful in a high speed railway vehicle.

REFERENCE SIGNS LIST

1 Brake disc
2 Disc section
2a Front surface
2b Rear surface
3 Fin section
3a Front end surface
4 Bolt hole
5a, 5b, 5c, 5d Groove
10 Wheel
11 Boss section
12 Rim section
13 Plate section
15 Bolt
16 Nut
20 Surface on outer peripheral side of groove

The invention claimed is:

1. A railway vehicle brake disc comprising a donut-shaped disc section having a sliding surface on a front surface side, a plurality of fin sections each convexly provided in a rear surface of the disc section in a radial pattern, and a bolt hole passing through the disc section and the fin section, in which the disc section is mounted on a wheel in a state where the fin sections are in press contact with a plate section of the wheel by being fastened with a bolt inserted into the bolt hole, wherein
the fin section has a groove formed along a circumferential direction in both of an area on an inner peripheral side and an area on an outer peripheral side of the bolt hole when viewed in a radial direction of the disc section, and a surface on an outer peripheral side of the groove formed respectively in an area on the inner peripheral side and in an area on the outer peripheral side in the fin section, the surface also adjacent to a front end surface of the fin section and facing the inner peripheral side when viewed in a radial direction of the disc section.

2. The railway vehicle brake disc according to claim 1, wherein a surface on an outer peripheral side of the groove is a plane or a concave surface.

3. The railway vehicle brake disc according to claim 1, wherein a ratio h/H of a depth h of the groove to a height H of the fin section falls within a range of 0.2 to 0.8.

4. The railway vehicle brake disc according to claim 1, wherein a width in the circumferential direction of the area on the outer peripheral side of the fin section is larger than a width in the circumferential direction of the area on the inner peripheral side of the fin section.

* * * * *